United States Patent [19]

Kobayashi et al.

[11] Patent Number: 5,259,347
[45] Date of Patent: Nov. 9, 1993

[54] ENGINE OUTPUT DRIVE ARRANGEMENT

[75] Inventors: Manabu Kobayashi; Keitaroh Hayashi, both of Iwata, Japan

[73] Assignee: Yamaha Hatsudoki Kabushiki Kaisha, Iwata, Japan

[21] Appl. No.: 900,242

[22] Filed: Jun. 17, 1992

[51] Int. Cl.$^5$ .............................................. F02F 7/00
[52] U.S. Cl. ................................ 123/197.1; 74/595; 180/297
[58] Field of Search ............. 123/197.1, 197.5; 180/297, 291; 74/545, 604, 579 E

[56] References Cited

U.S. PATENT DOCUMENTS

| | | | |
|---|---|---|---|
| 1,495,786 | 5/1924 | Finley et al. | 123/197.1 |
| 1,765,986 | 6/1930 | MacKenzie. | |
| 3,703,107 | 11/1972 | Piret | 74/695 |
| 4,121,480 | 10/1978 | Andreen | 123/197.5 |
| 4,223,567 | 9/1980 | Onda | 74/606 R |
| 4,395,980 | 8/1983 | Tominaga et al. | 123/90.27 |
| 4,440,123 | 4/1984 | Tsai | 74/595 |
| 4,722,235 | 2/1988 | Kumazawa | 180/297 |
| 4,798,254 | 1/1989 | Lings | 180/50 |
| 5,062,394 | 11/1991 | Belford | 123/197.1 |
| 5,066,266 | 11/1991 | Kobayashi | 180/297 |
| 5,085,186 | 2/1991 | Kobayashi | 180/291 |

FOREIGN PATENT DOCUMENTS

| | | |
|---|---|---|
| 698056 | 11/1964 | Canada. |
| 0196871 | 10/1986 | European Pat. Off. |
| 3210926 | 10/1983 | Fed. Rep. of Germany. |
| 952611 | 11/1949 | France. |
| 1520768 | 3/1968 | France. |
| 2032160 | 11/1970 | France. |
| 289694 | 8/1973 | U.S.S.R. |
| 976014 | 11/1964 | United Kingdom. |
| 2179604 | 3/1987 | United Kingdom. |

Primary Examiner—Tony M. Argenbright
Assistant Examiner—M. Macy
Attorney, Agent, or Firm—Ernest A. Beutler

[57] ABSTRACT

Two embodiments of compact engine assemblies wherein the engine output shaft drives a driveshaft to which a flywheel is affixed. The flywheel is positioned closely adjacent one end of the engine output shaft and the engine output shaft drives the driveshaft by a gear drive that is positioned between the end main bearing of the engine output shaft and the first adjacent intermediate main bearing for limiting torsional stresses on the driveshaft.

38 Claims, 4 Drawing Sheets

5,259,347

ENGINE OUTPUT DRIVE ARRANGEMENT

BACKGROUND OF THE INVENTION

This invention relates to an engine output drive arrangement and more particularly to an improved and compact power take-off arrangement for an internal combustion engine.

As is well known, the internal combustion engines employed for powering motor vehicles such as automobiles are becoming extremely compact and yet are nevertheless called upon to drive a greater and greater number of engine and vehicle accessories. As the engine becomes more compact and as the number of accessories driven increases, the serviceability of the engine becomes quite a problem. These problems are particularly acute in conjunction with a form of engine placement wherein the engine output shaft runs transversely of the engine compartment rather than longitudinally of the engine compartment (east/west vs. north/south).

A type of engine arrangement is disclosed in U.S. Pat. No. 5,024,287, entitled "Engine Unit for Vehicles," issued Jun. 18, 1991 in the names of Kaoru Okui and Manabu Kobayashi, which patent is assigned to the assignee hereof. In accordance with the disclosure shown in that patent, and particularly the embodiment of FIGS. 6-8 thereof, an extremely compact engine arrangement is provided. This is accomplished by having the engine output shaft drive a driveshaft that is rotatable about an axis that is parallel to but offset from the axis of rotation of the engine output shaft. The driveshaft actually drives the vehicle through a flywheel that is positioned at one end of the driveshaft and which overlaps in part the engine output shaft. The drive for the driveshaft is taken from between the ends of the engine output shaft. In addition, the overhead camshafts for the engine are also driven by this drive shaft.

Although that arrangement has the advantages as aforenoted, because of the fact that the driveshaft is driven at a point offset from the ends of the engine output shaft, torsional loading may be placed on the driveshaft.

It is, therefore, a principal object of this invention to provide an improved and compact engine drive arrangement wherein torsional loadings on the driveshaft are substantially reduced from prior art type of constructions.

It is a further object of this invention to provide an improved, compact drive arrangement for an engine driveshaft wherein torsional loadings are reduced without any sacrifice in the compact construction of the engine.

SUMMARY OF THE INVENTION

This invention is adapted to be embodied in an internal combustion engine that is comprised of an engine assembly forming a plurality of adjacent combustion chambers. An engine output shaft is rotatable about a first axis and is driven by the combustion occurring in the combustion chambers. At least a pair of end main bearings each support a respective end of the engine output shaft for rotation in the engine assembly. At least one intermediate main bearing supports the engine output shaft for its rotation in the engine assembly and is positioned between the end main bearings. A driveshaft is rotatably journaled by the engine assembly for rotation about a second axis that is parallel to the first axis. Means on the engine output shaft positioned between one of the end main bearings and the intermediate bearing drives the driveshaft.

DETAILED DESCRIPTION OF THE PREFERRED EMBODIMENTS OF THE INVENTION

Figure 1:
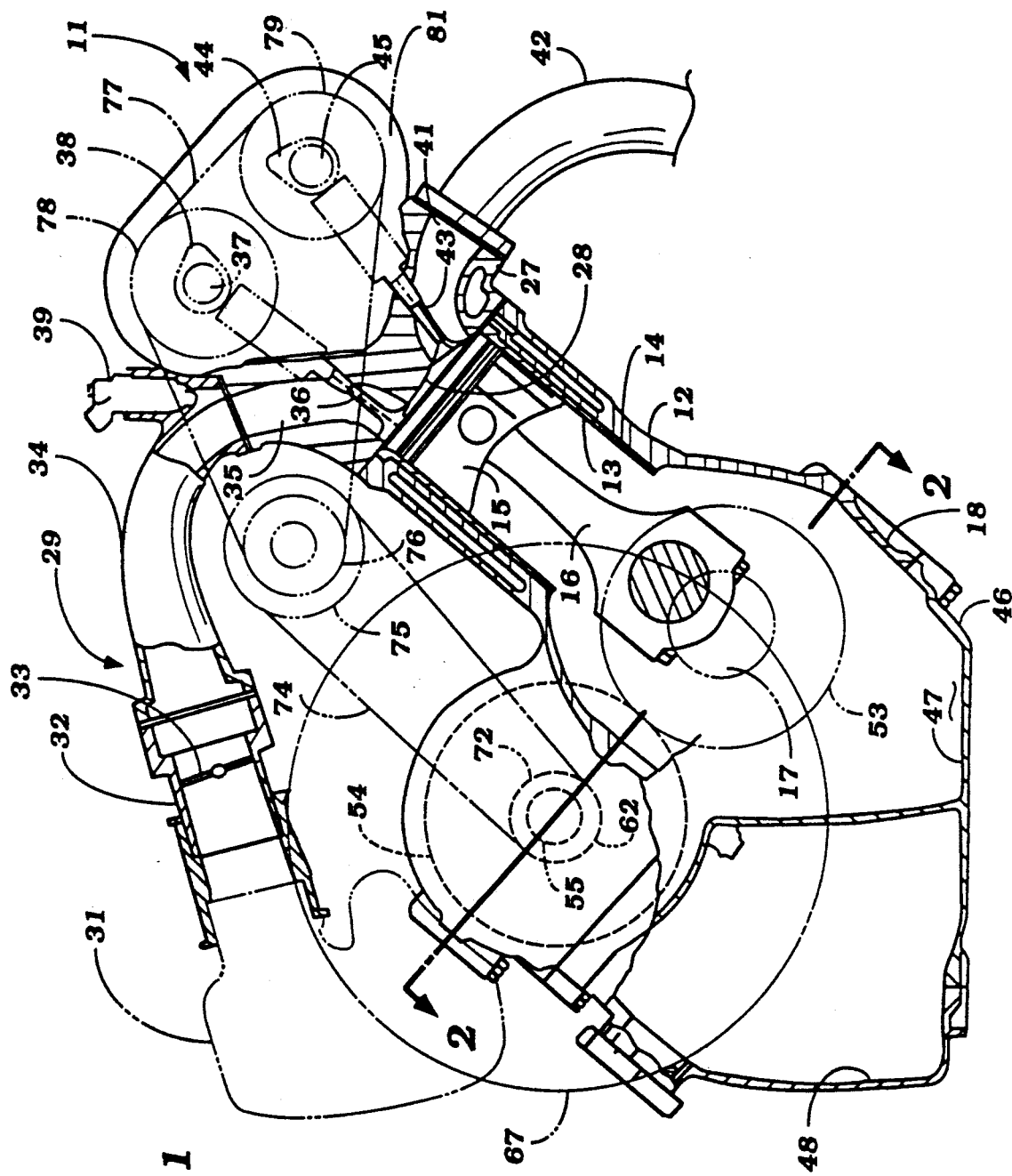
FIG. 1 is a cross-sectional view taken through an internal combustion engine constructed in accordance with an embodiment of this invention.
Figure 2:
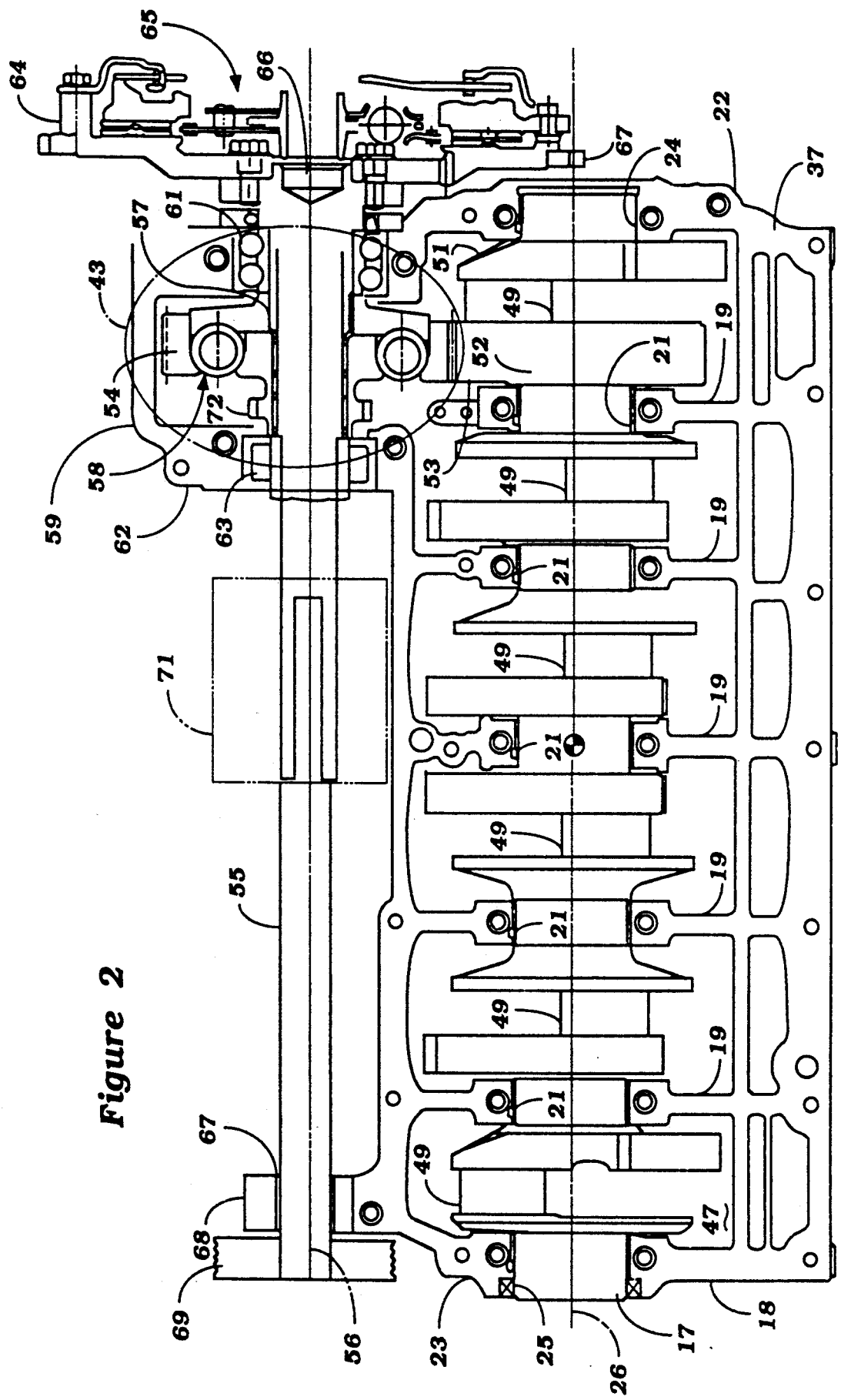
FIG. 2 is an enlarged cross-sectional view taken along the line 2—2 of FIG. 1.
Figure 3:
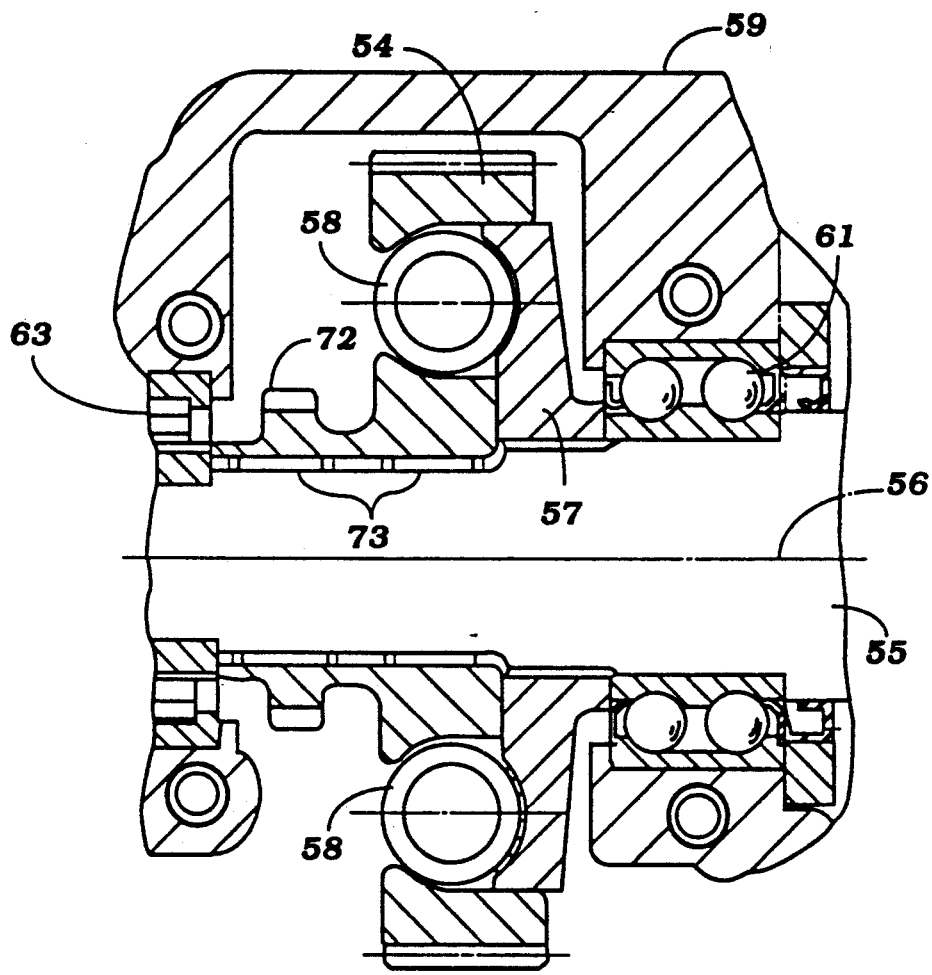
FIG. 3 is a further enlarged cross-sectional view of the area encompassed by the circle 3 in FIG. 2.

An automotive type internal combustion engine constructed in accordance with an embodiment of the invention is depicted in FIGS. 1-3 and is identified generally by the reference numeral 11. The engine 11 includes a cylinder block 12 having a plurality of aligned cylinder bores 13 which are formed by liners 14 that are pressed or cast into the cylinder block assembly 12. In the illustrated embodiment, the engine 11 is of the six cylinder in-line type. It is to be understood, however, that the invention can be used in conjunction with engines having other numbers of cylinders and also in engines that do not have cylinders but rather have other forms of combustion chambers such as rotating type engines. Also, it should be noted that the cylinder block 12 is disposed so that the axes of the cylinder bores 13 are inclined from the vertical in a rearward direction. FIG. 1 illustrates the engine as it would appear in the engine compartment of a transverse engine front-wheel drive vehicle so that the engine would incline rearwardly toward the fire wall so as to permit a low hood line.

Pistons 15 reciprocate in the cylinder bores 13 and are connected by means of connecting rods 16 to the individual throws of a crankshaft 17.

FIG. 2 shows the arrangement by which the crankshaft 17 is rotatably journaled within the cylinder block 12 and this rotatable journaling further includes a first crankcase member 18 that is affixed to the skirt of the cylinder block 12 in a known manner and which has a plurality of intermediate webs 19, each of which carries an intermediate main bearing 21 which journals an intermediate main bearing portion of the crankshaft 17 in a well known manner. The intermediate main bearings 21 are split bearings and each half is carried either by the web 19 of the crankcase member 18 or a corresponding web (not shown) of the cylinder block 12. In addition, the cylinder block 12 and crankcase member 18 are provided with respective end walls 22 and 23 which carry respective end main bearings 24 and 25 to complete the rotational support of the crankshaft 17 about an axis 26 which extends transversely across the engine compartment.

A cylinder head assembly, indicated generally by the reference numeral 27, is affixed to the cylinder block 12 in a known manner and has individual recesses 28 which cooperate with the cylinder bores 13 and heads of the piston 15 to define the variable volume chambers in which combustion occurs.

An intake charge is delivered to the chambers through an induction system, indicated generally by the reference numeral 29, which includes an air inlet device including an air filter, shown in phantom and identified generally by the reference numeral 31. The air inlet device 31 communicates with a throttle body 32 in which a throttle valve 33 is positioned for controlling the speed of the engine. The throttle body 32 supplies an intake manifold 34 having individual runners that cooperate with intake passages 35 formed in one side of the cylinder head 27 and which terminate in the cylinder head recesses 28. Poppet type intake valves 36 control the communication of the intake passages 35 with the aforenoted combustion chamber. It should be noted that the engine may be provided with either a single intake valve 36 for each combustion chamber or may be provided with multiple intake valves.

The intake valves 36 are opened and closed under the operation of an intake camshaft 37 that is journaled in the cylinder head 27 in an appropriate manner and which has cam lobes 38 that engage thimble tappets (not shown) for opening the intake valves 36. Coil compression springs (not shown) are incorporated for closing the intake valves 36, as is well known in this art.

One or more fuel injectors 39 are mounted in the runners of the intake manifold 34 for supplying a fuel charge to the intake passages 35 for engine combustion.

A spark plug (not shown) is mounted in the cylinder head assembly 27 for each recess 28 and fires the charge in the combustion chamber in a well known manner.

Exhaust passages 41 extend through the opposite side of the cylinder head assembly 27 from the intake passages 35 and communicate with an exhaust manifold 42. Exhaust valves 43 are slidably supported in the cylinder head assembly 27 and control the communication of the cylinder head recesses 28 with the exhaust passages 41. As with the intake valves 36, one or more exhaust valves 43 may be employed for each cylinder bore 13.

The exhaust valves 43 are opened by the exhaust lobes 44 of an exhaust camshaft 45 that is journaled in the cylinder head assembly 27 in a known manner. The cam lobes 44 act on thimble tappets to open the exhaust valves 43 and the exhaust valves 43 are closed by coil compression springs, in a well known manner.

It should be noted that the basic construction of the engine, except for the driveshaft, to be discussed, and the drive for the intake and exhaust camshafts 37 and 45 may be considered to be conventional in construction and reference may be had to aforenoted U.S. Pat. No. 5,024,287 for the basic details of the engine construction. In fact, the drive for the driveshaft and the camshafts 37 and 45 is basically the same as that shown in U.S. Pat. No. 5,024,287 and differs only in the placement of the drive, as should be apparent to those skilled in the art. For that reason, any details of the engine 11 which are not disclosed herein may be considered to be the same as that of U.S. Pat. No. 5,024,287, the disclosure of which incorporated herein.

The crankcase of the engine 11 is completed by means of a lower crankcase member 46 which is affixed to the crankcase member 18 and cylinder block 12 in a suitable manner. This lower crankcase member 46 with the crankcase member 18 defines the crankcase chamber 47 in which the crankshaft 17 rotates. In addition, the crankcase member 46 may form a dry sump tank 48 that is positioned at the lower forward portion of the engine, as is also described in U.S. Pat. No. 5,024,287.

It should be noted that the individual throws of the crankshaft 17, indicated by the reference numerals 49, which journal the big ends of the connecting rods 16 are each positioned between either the intermediate webs 19 of the crankcase member 18 and cylinder block 12 or between the end webs 19 and the respective end walls 22 and 23. This provides a very rigid support for the crankshaft and the crankshaft bearings.

The throw 49 adjacent the end wall 22 and between the first intermediate web 19 is defined by a normal web portion 51 which is counterweighted and by a web portion 52 that is formed with an integral drive gear 53. The drive gear 53 is disposed immediately adjacent the web 19 and drives a driven gear 54 that is coupled to a driveshaft 55 which is journaled for rotation, in a manner to be described, about a rotational axis which extends parallel to the axis 26 but which is offset to the front side of the engine and which is at a higher vertical plane, as clearly seen in FIG. 1. This driveshaft axis is indicated by the dot-dash line 56. The driven gear 54 is connected to the driveshaft 55 by means of a splined connection 57 and torsional damper of the coil spring type, indicated generally by the reference numeral 58. It should be noted that the gears 53 and 54 are also positioned within the crankcase chamber 47 and actually an L-shaped extension of it formed by a portion 59 of the crankcase portion 18 and cylinder block skirt 12 and lower crankcase portion 46. This portion 56 has a first end wall that is spaced axially inwardly from the end wall 22 and which carries a first ball bearing assembly 61 that journals the driveshaft 56 at a point adjacent but offset from the end main bearing 24.

The portion 59 has a further wall 62 that extends parallel to this offset wall and which carries a second bearing assembly 63 for further journaling the driveshaft 55. The bearing 63 is offset toward the center of the engine from the first intermediate main bearing 21 of the crankshaft 17 as clearly shown in FIG. 2. As a result of this, the drive for the driveshaft 55 is positioned close to the end of the crankshaft 17 and close to the end of the driveshaft so as to minimize the problem of torsional vibrations.

A flywheel, indicated generally by the reference numeral 64, is affixed to the driveshaft 55 and lies closely adjacent the end wall 22 and has its outer periphery overlapping the crankshaft 17 as clearly shown in FIGS. 1 and 2. This provides a very compact engine assembly and reduces the overall length of the engine from conventional arrangements wherein the flywheel is mounted to the end of the crankshaft and also reduces the effect of torsional loadings on the driveshaft 55 since the driven gear 54 is positioned close to the flywheel 64.

The flywheel 64 carries a clutch assembly, indicated generally by the reference numeral 65 which drives a primary shaft 66 of a transmission in a well known manner. A starter gear 67 is also affixed to the flywheel 64 for starting of the engine 11 in a well known manner.

As may be seen in FIG. 2, the driveshaft 55 extends beyond the wall 62 and has a portion which is exposed. At the opposite end of the engine 11, the driveshaft 55 is supported by a further bearing 67 that is positioned in an extension 68 of the cylinder block 12 and the crankcase member 18. A drive pulley 69 may be affixed to this end of the driveshaft 55 for driving a plurality of engine accessories. Also, a combined scavenge and pressure pump assembly 71 for the lubrication system may be driven from the exposed portion of the driveshaft 55 in a known manner, for example as shown in U.S. Pat. No. 5,024,287.

A driving sprocket 72, formed integrally with the hub portion of the driven gear 54, is supported by needle bearing 73 on the driveshaft 55. The sprocket 72 drives a first chain 74 which, in turn, drives a driven sprocket 75 that is rotatably journaled in the cylinder head assembly 27 in a suitable manner at one side of the engine. A further sprocket 76 is integrally formed with the sprocket 75 and drives a second chain 77 which, in turn, drives sprockets 78 and 79 that are affixed to the intake and exhaust camshafts 37 and 45, respectively, to drive these camshafts. The camshaft drive is such that the camshafts 37 and 45 are driven at one-half the rotational speed of the crankshaft 17 but, as is also described in U.S. Pat. No. 5,024,287, this two-to-one drive ratio may be established in steps between the driving gear 53 and driven gear 54, sprocket 71 and sprocket 75 and sprocket 76 and sprocket 78 and 79. The cam drive mechanism is enclosed by means of a cam cover 81 that is affixed to the cylinder head 27 in any suitable manner.

Figure 4:
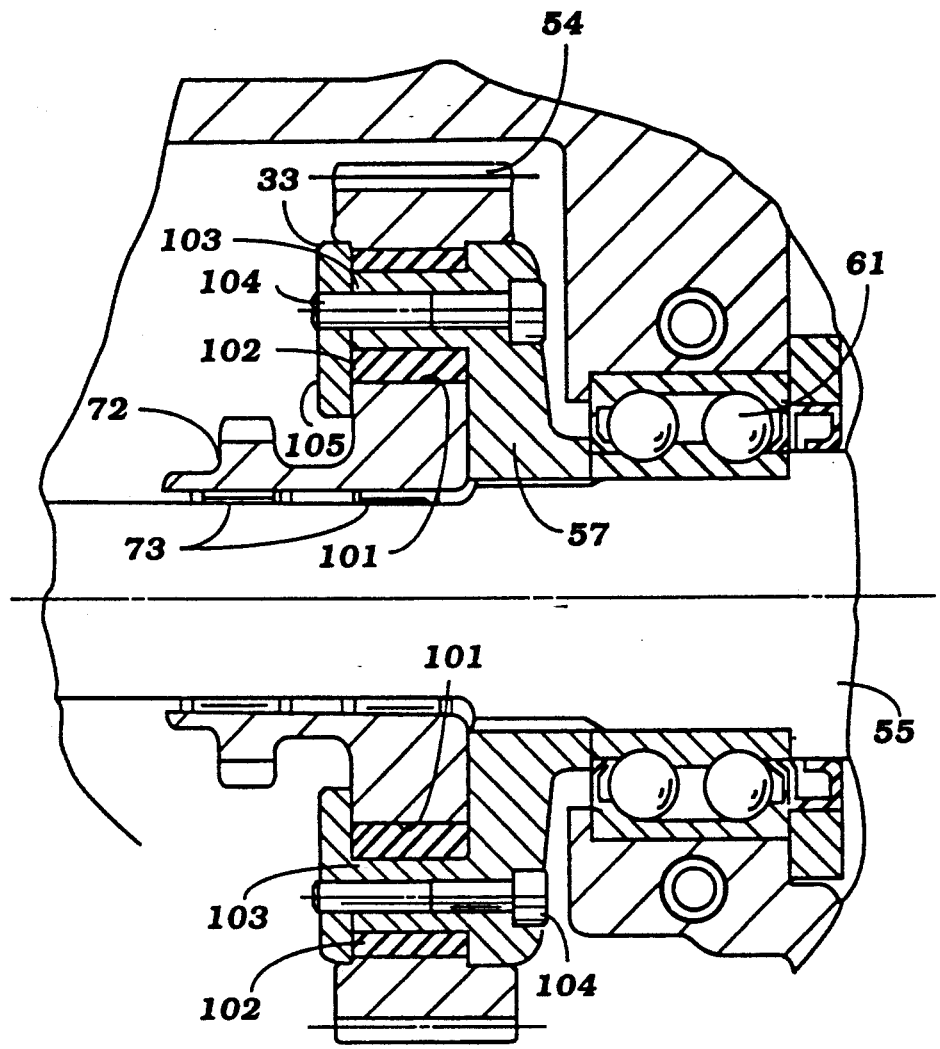
FIG. 4 is a cross-sectional view, in part similar to FIG. 3, and shows another embodiment of the invention.

FIG. 4 is a partial cross-sectional view, in part similar to FIG. 3, and which shows another embodiment of the invention. This embodiment of the invention differs from the previously described embodiment only in the type of torsional coupling which couples the driven gear 54 to the driveshaft 55 and camshaft driving sprocket 72. For that reason, only a partial view is necessary to understand the construction and operation of this embodiment and components which are the same as those of the previously described embodiment have been identified by the same reference numerals. In this embodiment, the driven gear 54 is provided with a plurality of circumferentially spaced bores 101 that receive elastomeric rings 102. The rings 102 encircle projections 103 formed on the portion 57 that establishes the keyed driving relationship to the driveshaft 55. Threaded fasteners 104 hold a cover plate 105 and the elastomeric rings 102 in position in the driven gear 54. In all other regards, this embodiment is the same as that previously described.

It should be readily apparent from the foregoing description that the described embodiments of the invention are extremely effective in providing a compact engine assembly wherein the flywheel can be positioned closer to the end of the engine than with previous constructions wherein the flywheel was directly connected to the engine output shaft and further, wherein the driveshaft to which the flywheel is affixed is driven from the crankshaft at a location close to the end of the flywheel so as to minimize torsional loadings on the driveshaft. Of course, the foregoing description is that of a preferred embodiment of the invention and various changes and modifications may be made without departing from the spirit and scope of the invention, as defined by the appended claims.

We claim:

1. An internal combustion engine for driving an external load comprising an engine assembly forming a plurality of adjacent combustion chambers, an engine output shaft rotatable about a first axis and driven by the combustion occurring in said combustion chambers, at least a pair of end main bearings each supporting a respective end of said engine output shaft for rotation in said engine assembly, at least one intermediate main bearing supporting said engine output shaft for rotation in said engine assembly and positioned between said end main bearings, a driveshaft journalled by said engine assembly for rotation about a second axis parallel to said first axis and drivingly coupled to said external load, and driving means on said engine output shaft positioned between one of said end main bearings and the immediately adjacent intermediate main bearing for driving said driveshaft.

2. An internal combustion engine as set forth in claim 1 wherein there are a plurality of intermediate main bearings supporting the engine output shaft between the end main bearings and wherein the driving means is positioned between the end main bearing and the first adjacent intermediate main bearing.

3. An internal combustion engine as set forth in claim 2 further including a flywheel affixed to the end of the driveshaft adjacent the one end main bearing.

4. An internal combustion engine as set forth in claim 3 wherein the flywheel has a diameter so that it overlaps the engine output shaft.

5. An internal combustion engine as set forth in claim 4 further including a pair of spaced apart bearings for journaling the driveshaft by the engine assembly, said pair of spaced apart bearings being disposed on axially opposite sides of the driving means.

6. An internal combustion engine as set forth in claim 5 wherein one of the spaced apart bearings journaling the driveshaft is disposed adjacent but inwardly of the one end main bearing in the direction of the axes.

7. An internal combustion engine as set forth in claim 5 wherein one of the pair of spaced apart bearings journaling the driveshaft is disposed inwardly from the intermediate main bearing adjacent the one end main bearing in the direction of the axes.

8. An internal combustion engine as set forth in claim 7 wherein the other of the pair of spaced apart bearings journaling the driveshaft is disposed adjacent but inwardly of the one end main bearing in the direction of the axes.

9. An internal combustion engine as set forth in claim 5 wherein the driving means further includes a torsional damper interposed between the driveshaft and the means for driving the driveshaft.

10. An internal combustion engine as set forth in claim 9 wherein the driving means comprises a gear train.

11. An internal combustion engine as set forth in claim 10 wherein the gear train comprises a drive gear fixed for rotation with the engine output shaft and a driven gear drivingly coupled to the driveshaft.

12. An internal combustion engine as set forth in claim 1 wherein the engine comprises a reciprocating engine and the adjacent combustion chambers are formed in part by cylinder bores.

13. An internal combustion engine as set forth in claim 12 wherein the engine assembly comprises a cylinder block and crankcase assembly.

14. An internal combustion engine as set forth in claim 13 wherein the end main bearings are supported in end walls of the cylinder block crankcase assembly and the intermediate main bearing is supported by an intermediate web of the cylinder block crankcase assembly.

15. An internal combustion engine as set forth in claim 14 wherein there are a plurality of intermediate main bearings supporting the engine output shaft between the end main bearings and wherein the driving means is positioned between the end main bearing and the first adjacent intermediate main bearing.

16. An internal combustion engine as set forth in claim 15 further including a flywheel affixed to the end of the driveshaft adjacent the one end main bearing.

17. An internal combustion engine as set forth in claim 16 wherein the flywheel has a diameter so that it overlaps the engine output shaft.

18. An internal combustion engine as set forth in claim 17 further including a pair of spaced apart bearings for journaling the driveshaft by the engine assembly, said pair of spaced apart bearings being disposed on opposite sides of the driving means.

19. An internal combustion engine as set forth in claim 18 wherein one of the spaced apart bearings journaling the driveshaft is disposed adjacent but inwardly of the one end main bearing in the direction of the axes.

20. An internal combustion engine as set forth in claim 18 wherein one of the pair of spaced apart bearings journaling the driveshaft is disposed inwardly from the intermediate main bearing adjacent the one end main bearing in the direction of the axes.

21. An internal combustion engine as set forth in claim 20 wherein the other of the pair of spaced apart bearings journaling the driveshaft is disposed adjacent but inwardly of the one end main bearing in the direction of the axes.

22. An internal combustion engine as set forth in claim 18 wherein the driving means further includes a torsional damper interposed between the driveshaft and the means for driving the driveshaft.

23. An internal combustion engine as set forth in claim 22 wherein the driving means comprises a gear train.

24. An internal combustion engine as set forth in claim 23 wherein the gear train comprises a drive gear fixed for rotation with the engine output shaft and a driven gear drivingly coupled to the driveshaft.

25. An internal combustion engine as set forth in claim 14 wherein the cylinder bores are inclined at an acute angle from the vertical.

26. An internal combustion engine as set forth in claim 25 wherein the second axis is positioned vertically above the first axis.

27. An internal combustion engine as set forth in claim 26 wherein there are a plurality of intermediate main bearings supporting the engine output shaft between the end main bearings and wherein the driving means is positioned between the end main bearing and the first adjacent intermediate main bearing.

28. An internal combustion engine as set forth in claim 27 further including a flywheel affixed to the end of the driveshaft adjacent the one end main bearing.

29. An internal combustion engine as set forth in claim 28 wherein the flywheel has a diameter so that it overlaps the engine output shaft.

30. An internal combustion engine as set forth in claim 29 further including a pair of spaced apart bearings for journaling the driveshaft by the engine assembly, said pair of spaced apart bearings being disposed on opposite sides of the driving means.

31. An internal combustion engine as set forth in claim 30 wherein one of the spaced apart bearings journaling the driveshaft is disposed adjacent but inwardly of the one end main bearing in the direction of the axes.

32. An internal combustion engine as set forth in claim 30 wherein one of the pair of spaced apart bearings journaling the driveshaft is disposed inwardly from the intermediate main bearing adjacent the one end main bearing in the direction of the axes.

33. An internal combustion engine as set forth in claim 32 wherein the other of the pair of spaced apart bearings journaling the driveshaft is disposed adjacent but inwardly of the one end main bearing in the direction of the axes.

34. An internal combustion engine as set forth in claim 30 wherein the driving means further includes a torsional damper interposed between the driveshaft.

35. An internal combustion engine as set forth in claim 34 wherein the driving means comprises a gear train.

36. An internal combustion engine as set forth in claim 35 wherein the gear train comprises a drive gear fixed for rotation with the engine output shaft and a driven gear drivingly coupled to the driveshaft.

37. An internal combustion engine as set forth in claim 14 further including a cylinder head affixed to the cylinder block assembly and rotatably journaling at least one camshaft for operating poppet valves associated with the cylinders of the cylinder block, and including second driving means for driving said camshaft from said engine output shaft.

38. An internal combustion engine as set forth in claim 37 wherein the second driving means includes a driving sprocket fixed for rotation with the driveshaft adjacent the means for driving the driveshaft.

* * * * *